United States Patent Office 3,118,983
Patented Jan. 21, 1964

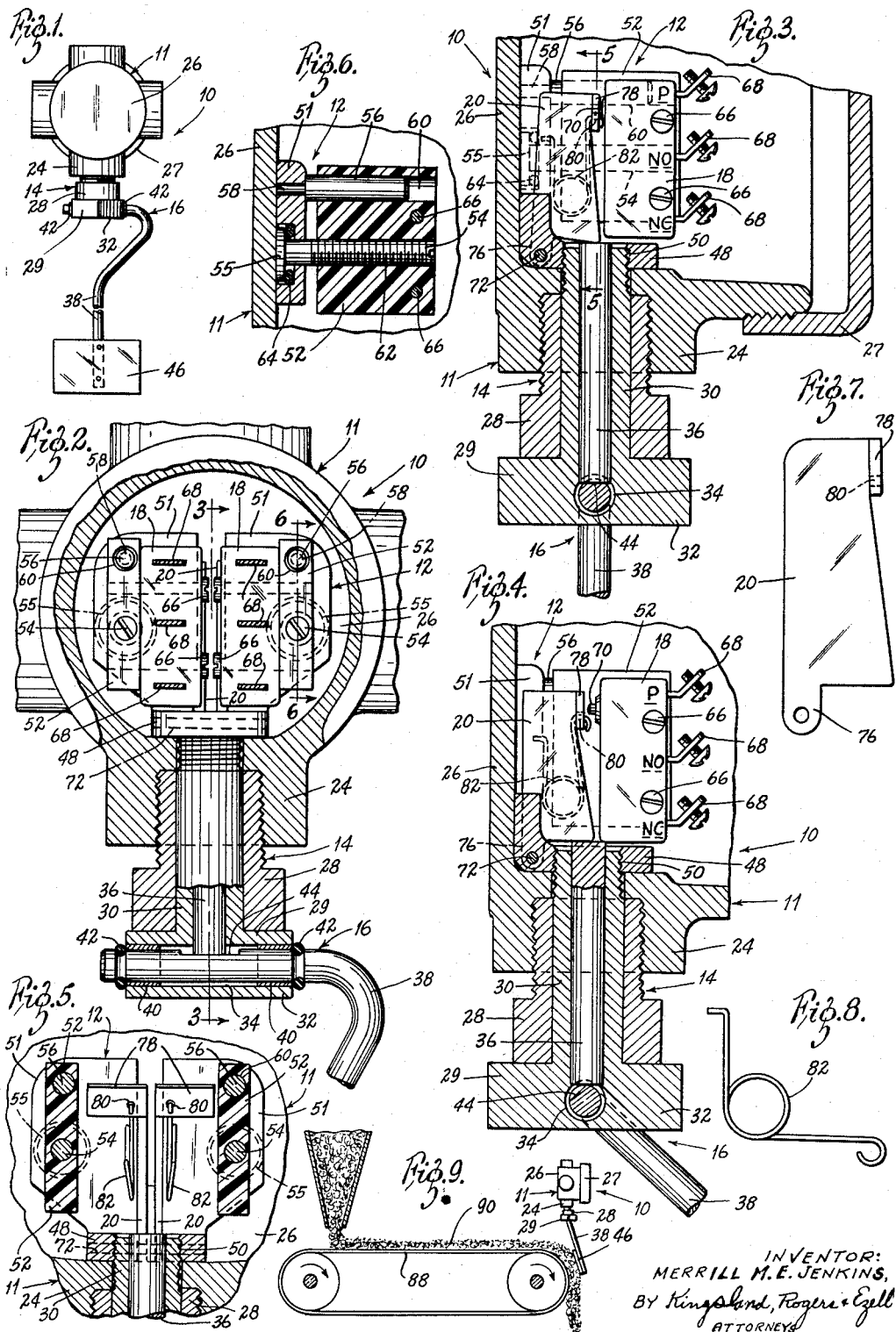

3,118,983
FLOW DETECTOR DEVICE
Merrill M. E. Jenkins, 8239 Davenport Drive,
Berkeley 34, Mo.
Filed Mar. 7, 1960, Ser. No. 13,358
3 Claims. (Cl. 200—61.42)

The present invention relates generally to flow detectors, and more particularly to a novel flow detector of extreme sensitivity incorporating structure for transferring motion effected by the flow or nonflow of material to the interior of an explosion-proof housing.

There has long been the need for a sensitive, highly effective, explosion-proof flow detector to control filling, packaging, binding, and the like, lines in feed mills, cereal plants, and the like. Numerous constructions have been provided, but, in the experience of the applicant, none fulfills all of the requirements desired in such a device. The present flow detector satisfactorily fulfills the need.

Therefore, an object of the present invention is to provide a novel flow detector which incorporates the requirements in a flow detector of the type mentioned in the foregoing paragraph.

In brief, the present novel flow detector includes a sealed housing, a piston housing and piston extending therefrom, an actuator for effecting movement of said piston which includes an arm for carrying a member or target to be engaged by flowing material, a base in the sealed housing into which the piston housing fits, switches mounted on the base, switch actuators mounted on the base for engagement by the piston, springs for biasing the switch actuators to close the switches, and connecting elements.

Another object of the present invention is to provide a novel flow detector which is adapted to immediately transfer motion of the piston actuator arm deflected by flow or lack of flow of material, as required, to the housed switches for energization or de-energization thereof.

Another object is to provide a novel flow detector which is highly sensitive to breaks in the flow of material, overflow, or the like, so that it will immediately effect stopping of the associated machinery upon a predetermined irregularity of material in the flow line.

Another object is to provide a novel flow detector which is compact in construction and explosion proof to provide wide application thereof.

Other objects are to provide a flow detector which is highly efficient in operation, which is relatively inexpensive, which will give long service with minimum maintenance, which is adjustable, and which otherwise fulfills the objects and advantages sought therefor.

The foregoing and other objects and advantages are apparent from the following description taken with the accompanying drawing, in which:

FIGURE 1 is an elevational view of a flow detector incorporating the teachings of the present invention;

FIGURE 2 is an enlarged vertical cross-sectional view through the flow detector of FIGURE 1, parts being in elevation, and fringe parts of the housing and the lower end of the piston actuator being broken away for conservation of space;

FIGURE 3 is an enlarged vertical cross-sectional view taken on substantially the line 3—3 of FIGURE 2, the piston actuator being in vertical relation and the switches being open or closed as determined by their individual wiring;

FIGURE 4 is an enlarged vertical cross-sectional view similar to FIGURE 3, but with the piston actuator at an angle and the switches opposed in position;

FIGURE 5 is a vertical cross-sectional view taken on substantially the line 5—5 of FIGURE 3;

FIGURE 6 is a vertical cross-sectional view taken on substantially the line 6—6 of FIGURE 2;

FIGURE 7 is a view of a switch actuator forming part of the flow detector;

FIGURE 8 is a view of a spring forming part of the flow detector; and

FIGURE 9 is a view of the flow detector mounted with the piston actuator and supported material-engaging member disposed in operative relation to material on a conveyor belt.

Referring to the drawing more particularly by reference numerals, 10 indicates generally a flow detector constructed in accordance with the principles of the present invention. Broadly, the flow detector 10 includes a housing 11, a base or bracket 12, a piston unit 14 connected into the base 12, a piston actuator unit 16 operatively supported by the piston unit 14, switches 18 mounted in spaced relation on the base 12, spring-biased switch actuators 20 pivotally mounted on the base 12 in operative relation with the piston unit 14 and the switches 18, and insulating, connecting and mounting elements.

The housing 11 may be of any desired configuration, but it should be just large enough to comfortably hold the elements. The housing 11 as shown includes an integral threaded boss 24 and a rear wall 26, the purpose of each of which is set out below. An inspection cover 27 is provided.

The piston unit 14 includes a threaded mounting sleeve 28, and a piston housing 29 of the configuration clearly shown in the drawing, the sleeve 28 being threaded into the boss 24. The piston housing 29 has a sleeve portion 30 disposed within the mounting sleeve 28, the inner or free end thereof being threaded and threadedly engaging the base 12. Integral with the sleeve 30 is a base portion 32 having an annular opening 34 therethrough at right angles to the sleeve portion 30. Within the sleeve portion 30 is a piston 36 which may be a rod segment of suitable diameter.

The piston actuator unit 16 includes a rod 38 of the configuration shown in the drawing, one end of which extends through the annular opening 34 and has rotative bearing support on spaced bearing sleeves 40. Plastic rings 42 mounted in suitable grooves in said end of the formed rod 38 maintain it against accidental removal. A portion of the upper end of the formed rod 38 is cut away to provide a flat surface 44 against which the lower flat end of the piston 36 is disposed when the formed rod 38 is in directly depending relation, as in FIGURE 2. It will be noted from FIGURES 3 and 4 that rocking action of the formed rod 38 in either direction will move the piston 36 upwardly for a purpose described below. To the lower end of the formed rod 38 is secured a materials contacting member or target 46, illustrated as a flat plate, although its configuration may be varied as desired for a particular job.

The base 12 is of the form shown in the drawing and comprises a horizontal flange 48 having a threaded aperture 50 receiving the threaded upper end of the sleeve 30, as mentioned above, and integral right and left vertical flange portions 51. It will be noted that the horizontal flange 48 is drawn against the floor of the housing 11 by the piston housing 29 to secure the elements firmly in position. Also, the vertical flange portions 51 abut the wall 26.

A rectangular switch supporting block 52 of Bakelite or other insulating material is mounted on each vertical flange portion 51 for adjustment towards and away from the respective vertical flange portion 51 by means of a headed threaded adjustment screw 54 and a guide pin 56 (FIGS. 5 and 6). The guide pin 56 has a reduced portion 58 mounted in an aperture in the flange portion 51, the main portion thereof being reciprocatively received in an opening 60 extending through the switch block 52. The headed adjustment screw 54 is threaded into a threaded opening 62 extending through the switch block 52 below the opening 60. The head 55 of the adjustment screw 54 is disposed in a suitable well or countersunk portion in the vertical flange portion 51 and is trapped therein by the wall portion 26, as illustrated. A suitable washer 64 is provided against which the head of the adjustment screw 54 may rotate.

The switches 18 are secured by suitable screws 66 on the switch block 52. The switches 18 are shown as of the normally closed or open micro-type, each including contacts 68 and a normally extended plunger actuator 70 (FIGS. 3 and 4), although another selected type may be used.

Pivotally mounted adjacent each swing 18 on a pin 72 extending through the base 12 is the spring-biased switch actuater 20 mentioned above, which is of the configuration illustrated (FIGS. 5 and 7). Each actuator 20 includes a pivot portion 76 and a flange portion 78 having an aperture 80 therein. It will be noted from FIGURES 3, 4, and 5 that the lower edges of the switch actuators 20 engage the upper end of the piston 36 for counterclockwise pivotal rotation thereby upon upward movement of the piston 36 (viewing FIGS. 3 and 4). Each flange portion 78 engages a plunger actuator 70. A spring 82 (FIG. 8) is mounted adjacent each switch actuator 20 with one free end disposed through the hole 80 in the respective flange portion 78 and the other free end seated in a socket provided therefor in the respective vertical flange portion 51 of the base 12, thereby biasing the switch actuator 20 clockwise (viewing FIGS. 3 and 4) to force the respective plunger actuator 70 inwardly to open or close the respective switch 18 when the piston 36 is in the position of FIGURE 3.

In use, it is clear from the foregoing description and drawing that the present flow detector 10 is located in respect to a belt conveyor 88, or the like, so that engagement of the materials-engaging member 46 with material 90 thereon will dispose the piston actuator unit 16 at an angle, so that the switch actuator 20 is in a position to permit the plunger actuator 70 to remain in substantially the position of FIGURE 4, the on, or closed, position of the switch 18. However, should there be a deficiency of the material 90, the materials-engaging member 46 will move to a vertical depending position, thereby permitting the piston 36 to move to the position of FIGURE 3. One or more of the switches 18 will be closed or opened as to the particular wiring by the switch actuators 20 to stop the machine, or the like, with which the flow detector 10 is operatively connected. Similarly, the flow detector 10 can be employed to operate upon the target or member 46 being engaged by an excess of material, in which event, the formed rod 38 will be bent, or normally open switches 18 can be employed. The combinations are many, as is manifest.

It will be noted that the switches 18 are adjustable towards and away from the vertical flange portions 50, hence, away from the switch actuators 20, by means of the adjustable switch blocks 52 on which they are mounted. Hence, within the predetermined range of the instant flow detector, the two switches 18 can be disposed for simultaneous or consecutive actuation. This feature enlarges the range of application of the flow detector 10.

It is apparent that there has been provided a novel flow detector which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. In combination, a flow detector comprising an explosion-proof housing, a base within said housing, a piston unit mounted on said base and extending through said housing including a piston extending into said housing and a piston actuator, said piston actuator comprising a target adapted for engagement with moving material, a switch adjustably mounted on said base including a plunger actuator, and a switch actuator pivotally mounted on said base, said switch actuator being biased into operative engagement with said plunger actuator and with an end of said piston, said switch actuator being movable by said piston into position out of engagement with said plunger actuator, said switch being adjustable to dispose its plunger actuator in selected relation to said switch actuator.

2. In combination, a flow detector comprising an explosion-proof housing, a base within said housing, a piston unit mounted on said base including a piston and a piston actuator, said piston actuator comprising a target disposed outside the housing and adapted for engagement with movable material, said target being pivotally mounted and adapted to effect movement of said piston in one direction and to permit movement in the opposite direction, a switch on said base, and a switch actuator movably mounted on said base for operative engagement with said switch, said switch being adjustable in relation to its actuator, said piston being in operative engagement with said switch actuator.

3. In combination, a flow detector comprising an explosion-proof housing, a base within said housing, a piston unit mounted on said base including a piston and a piston actuator, said piston actuator comprising a target adapted for engagement with movable material, an insulation block mounted on said base for adjustment towards and away from a portion of the base, a switch mounted on said block for movement therewith, a switch actuator member pivotally mounted on said base, means biasing said switch actuator member into engagement with said piston and with said switch, and means for adjusting the position of said switch in relation to said switch actuator, said piston being movable in one direction to break engagement of said switch actuator with said switch and in the other direction to permit engagement of said switch actuator with said switch.

References Cited in the file of this patent

UNITED STATES PATENTS

| | | |
|---|---|---|
| 1,298,950 | Hull | Apr. 1, 1919 |
| 2,357,878 | Crew | Sept. 12, 1944 |
| 2,587,747 | McCullough | Mar. 4, 1952 |
| 2,719,889 | Miller | Oct. 4, 1955 |
| 2,773,955 | Haydon et al. | Dec. 11, 1956 |
| 2,789,176 | Mercier | Apr. 16, 1957 |
| 2,801,308 | Cubellis | July 30, 1957 |
| 2,814,701 | Rayer | Nov. 26, 1957 |
| 2,886,675 | Berry | May 12, 1959 |
| 2,904,652 | Crane | Sept. 15, 1959 |
| 2,907,844 | Lindsey | Oct. 6, 1959 |